(12) United States Patent
Chang et al.

(10) Patent No.: US 9,391,338 B2
(45) Date of Patent: Jul. 12, 2016

(54) ELECTROLYTE-MEMBRANELESS MICROBIAL FUEL CELL, IN-SERIES STACK THEREOF, AND IN-PARALLEL COMBINATION THEREOF

(71) Applicant: GWANGJU INSTITUTE OF SCIENCE AND TECHNOLOGY, Gwangju (KR)

(72) Inventors: In Seop Chang, Gwangju (KR); Junyeong An, Gwangju (KR); Bongkyu Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 404 days.

(21) Appl. No.: 14/144,014

(22) Filed: Dec. 30, 2013

(65) Prior Publication Data
US 2014/0287272 A1    Sep. 25, 2014

(30) Foreign Application Priority Data
Mar. 22, 2013  (KR) ................. 10-2013-0030825

(51) Int. Cl.
*H01M 8/16* (2006.01)
*H01M 8/24* (2016.01)

(52) U.S. Cl.
CPC .............. *H01M 8/16* (2013.01); *H01M 8/2405* (2013.01); *Y02E 60/527* (2013.01)

(58) Field of Classification Search
CPC ..... H01M 8/16; H01M 8/2405; Y02E 60/527
See application file for complete search history.

(56) References Cited

U.S. PATENT DOCUMENTS

| | | | | |
|---|---|---|---|---|
| 2005/0208343 A1* | 9/2005 | Kim | ................. | H01M 4/86 429/2 |
| 2009/0305084 A1* | 12/2009 | Crookes | ................. | H01M 8/16 429/2 |
| 2012/0164544 A1* | 6/2012 | Nevin | ................. | H01M 8/16 429/401 |

* cited by examiner

*Primary Examiner* — Brittany Raymond
(74) *Attorney, Agent, or Firm* — Hauptman Ham, LLP

(57) ABSTRACT

Disclosed herein are an electrolyte-membraneless microbial fuel cell, in-series stack thereof, and in-parallel combination thereof. According to various implementation examples, problems relating to scaling up and modularization are overcome, and problems relating to using an electrolyte membrane are solved.

10 Claims, 6 Drawing Sheets

ELECTROLYTE-MEMBRANELESS MICROBIAL FUEL CELL, IN-SERIES STACK THEREOF, AND IN-PARALLEL COMBINATION THEREOF

CROSS REFERENCE TO RELATED APPLICATION

This application claims the benefit of Korean Patent Application No. 10-2013-0030825, filed on Mar. 22, 2013, which is hereby incorporated by reference in its entirety into this application.

BACKGROUND OF THE INVENTION

1. Technical Field

The present invention relates to an electrolyte-membraneless microbial fuel cell, in-series stack thereof, and in-parallel combination thereof.

2. Description of the Related Art

A microbial fuel cell (MFC) is well known as a promising technology that generates electricity from waste organic matter. However, it is not actually used in waste water disposal plants because there are many technical problems in scaling up. In order to solve the technical problems, structure of unit cells that simplifies the system and is scaled up is required, which also needs to be stacked so as to configure a module system.

An existing MFC has the structure including two chambers and an electrolyte membrane therebetween and is difficult to scale up in the structure. Further, using the electrolyte membrane increases cost for configuring the system and has a problem in that the membrane may be contaminated during operation. Moreover, it is required to increase mechanical property of the electrolyte membrane so that it endures high pressure.

In order to scale up an MFC, a module system in which MFCs are stacked is required. In order for an MFC to generate power actually usable, it should generate voltage of at least 3V to 5V. However, a single MFC cannot reach those levels. Therefore, MFCs are provided as a module system in which MFCs are stacked on one another.

SUMMARY OF THE INVENTION

An object of the present invention is to provide an electrolyte-membraneless microbial fuel cell which can be scaled up and be modularized even easily, in-series stack thereof, and in-parallel combination thereof.

According to an exemplary embodiment of the present invention, there is provided an electrolyte-membraneless microbial fuel cell, a unit of the microbial fuel cell including: (a) a body having an empty top, bottom and inside; (b) a cathode disposed on the top of the body; (c) an anode disposed on the bottom of the body; (d) a plate disposed on a lower surface of the anode; (e) electrochemically active microorganisms disposed on an upper surface of the anode; (f) a substrate-containing solution disposed filling the space inside the body between a lower surface of the cathode and the upper surface of the anode; (g) an inlet via which the substrate-containing solution is introduced; and (h) an outlet via which the substrate-containing solution is discharged, wherein: an upper surface of the plate is electrically connected to the lower surface of the anode; the electrochemically active microorganisms biodegrade the substrate to generate electrons and hydrogen ions, the hydrogen ions passing through the substrate-containing solution to be transferred to the lower surface of the cathode, and the electrons being transferred to the cathode through the plate; the inlet and the outlet are disposed in two different spaces when the space inside the body between the lower surface of the cathode and the upper surface of the anode is equally divided into the two different spaces horizontally; and the cathode, the anode, and the plate are sealed in the body so that the substrate-containing solution does not leak through other portions than the outlet.

According to another exemplary embodiment of the present invention, there is provided an in-series stack of electrolyte-membraneless microbial fuel cells.

According to yet another exemplary embodiment of the present invention, there is provided an in-parallel combination of stacks of electrolyte-membraneless microbial fuel cells.

DESCRIPTION OF THE EXEMPLARY EMBODIMENTS

Figure 1:
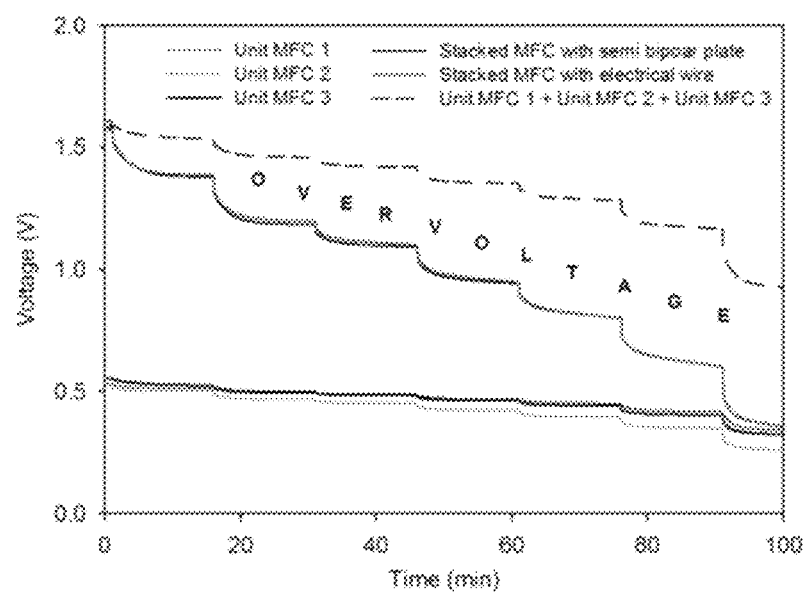
FIG. 1 is a diagram showing graphs for comparing the performances of MFC units, a stacked MFC with semi bipolar plate, a stacked MFC with electrical wire and theoretical sums of the MFC unit cells.

Exemplary embodiments of the present disclosure will now be described in detail with reference to the accompanying drawings.

According to an aspect of the present invention, a unit of the microbial fuel cell is provided, including: (a) a body having empty top, bottom and inside; (b) a cathode disposed on the top of the body; (c) an anode disposed on the bottom of the body; (d) a plate disposed on a lower surface of the anode; (e) electrochemically active microorganisms disposed on an upper surface of the anode; (f) a substrate-containing solution disposed filling the space inside the body between a lower surface of the cathode and the upper surface of the anode; (g) an inlet via which the substrate-containing solution is introduced; and (h) an outlet via which the substrate-containing solution is discharged.

An upper surface of the plate is electrically connected to the lower surface of the anode.

Further, the electrochemically active microorganisms biodegrade the substrate to generate electrons and hydrogen ions, the hydrogen ions passing through the substrate-containing solution to be transferred to the lower surface of the cathode, and the electrons being transferred to the cathode through the plate.

In addition, the inlet and the outlet are disposed in two different spaces when the space inside the body between the lower surface of the cathode and the upper surface of the anode is equally divided into the two different spaces horizontally.

Moreover, the cathode, the anode, and the plate are sealed in the body so that the substrate-containing solution does not leak through other portions than the outlet.

According to another aspect of the present invention, a stack of electrolyte-membraneless microbial fuel cells is provided, including (A) a first electrolyte-membraneless microbial fuel cell, (B) a second electrolyte-membraneless microbial fuel cell, . . . , (n−1)th a (n−1)th electrolyte-membraneless microbial fuel cell, and (N) an nth electrolyte-membraneless microbial fuel cell.

The second electrolyte-membraneless microbial fuel cell is disposed under the first electrolyte-membraneless microbial fuel cell, . . . , the nth electrolyte-membraneless microbial fuel cell is disposed under the (n−1)th electrolyte-membraneless microbial fuel cell.

Each of the first electrolyte-membraneless microbial fuel cell, the second electrolyte-membraneless microbial fuel cell, . . . , the (n−1)th electrolyte-membraneless microbial fuel cell, and the nth electrolyte-membraneless microbial fuel cells is the electrolyte-membraneless microbial fuel cell according to any one of the various exemplary embodiments.

Specifically, the (A) first electrolyte-membraneless microbial fuel cell includes: (Aa) a first body having empty top, bottom and inside; (Ab) a first cathode disposed on the top of the first body; (Ac) a first anode disposed on the bottom of the first body; (Ad) a first plate disposed on a lower surface of the first anode; (Ae) first electrochemically active microorganisms disposed on an upper surface of the first anode; (Af) a first substrate-containing solution filling a first space inside the first body between a lower surface of the first cathode and the upper surface of the first anode; (Ag) a first inlet via which the first substrate-containing solution is introduced; and (Ah) a first outlet via which the first substrate-containing solution is discharged, wherein an upper surface of the first plate is electrically connected to the lower surface of the first anode, the first electrochemically active microorganisms biodegrade the first substrate to generate electrons and hydrogen ions, the hydrogen ions passing through first the substrate-containing solution to be transferred to the lower surface of the first cathode, and the electrons being transferred to the cathode through the first plate, the first inlet and the first outlet are disposed in two different spaces when the first space inside the first body between the lower surface of the first cathode and the upper surface of the first anode is equally divided into the two different spaces horizontally, and the first cathode, the first anode, and the first plate are sealed in the first body so that the first substrate-containing solution does not leak through other portions than the first outlet.

Likewise, the (B) second electrolyte-membraneless microbial fuel cell includes: (Ba) a second body having empty top, bottom and inside; (Bb) a second cathode disposed on the top of the second body; (Bc) a second anode disposed on the bottom of the second body; (Bd) a second plate disposed on a lower surface of the second anode; (Be) second electrochemically active microorganisms disposed on an upper surface of the second anode; (Bf) a second substrate-containing solution filling a second space inside the second body between a lower surface of the second cathode and the upper surface of the second anode; (Bg) a second inlet via which the second substrate-containing solution is introduced; and (Bh) a second outlet via which the second substrate-containing solution is discharged, wherein an upper surface of the second plate is electrically connected to the lower surface of the second anode, the second electrochemically active microorganisms biodegrade the second substrate to generate electrons and hydrogen ions, the hydrogen ions passing through second the substrate-containing solution to be transferred to the lower surface of the second cathode, and the electrons being transferred to the cathode through the second plate, the second inlet and the second outlet are disposed in two different spaces when the second space inside the second body between the lower surface of the second cathode and the upper surface of the second anode is equally divided into the two different spaces horizontally, and the second cathode, the second anode, and the second plate are sealed in the second body so that the second substrate-containing solution does not leak through other portions than the second outlet.

Further, the (N−1) the electrolyte-membraneless microbial fuel cell includes: ((n−1)a) a (n−1)th body having empty top, bottom and inside; ((n−1)b) a (n−1)th cathode disposed on the top of the (n−1)th body; ((n−1)c) a (n−1)th anode disposed on the bottom of the (n−1)th body; ((n−1)d) a (n−1)th plate disposed on a lower surface of the (n−1)th anode; ((n−1)e) (n−1)th electrochemically active microorganisms disposed on an upper surface of the (n−1)th anode; ((n−1)f) a (n−1)th substrate-containing solution filling the space inside the (n−1)th body between a lower surface of the (n−1)th cathode and the upper surface of the (n−1)th anode; ((n−1)g) an (n−1) th inlet via which the (n−1)th substrate-containing solution is introduced; and ((n−1)h) an (n−1)th outlet via which the (n−1)th substrate-containing solution is discharged, wherein an upper surface of the (n−1)th plate is electrically connected to the lower surface of the (n−1)th anode, the (n−1)th electrochemically active microorganisms biodegrade the (n−1)th substrate to generate electrons and hydrogen ions, the hydrogen ions passing through (n−1)th the substrate-containing solution to be transferred to the lower surface of the (n−1)th cathode, and the electrons being transferred to the cathode through the (n−1)th plate, the (n−1)th inlet and the (n−1)th outlet are disposed in two different spaces when the space inside the (n−1)th body between the lower surface of the (n−1)th cathode and the upper surface of the (n−1)th anode is equally divided into the two different spaces horizontally, and the (n−1)th cathode, the (n−1)th anode, and the ((n−1)th plate are sealed in the (n−1)th body so that the (n−1)th substrate-containing solution does not leak through other portions than the (n−1)th outlet.

Likewise, the (N) nth electrolyte-membraneless microbial fuel cell includes: (n1) a nth body having empty top, bottom and inside; (n2) a nth cathode disposed on the top of the nth body; (n3) a nth anode disposed on the bottom of the nth body; (n4) a nth plate disposed on a lower surface of the nth anode; (n5) nth electrochemically active microorganisms disposed on an upper surface of the nth anode; (n6) a nth substrate-containing solution filling the space inside the nth body between a lower surface of the nth cathode and the upper surface of the nth anode; (n7) an nth inlet via which the nth substrate-containing solution is introduced; and (n8) an nth outlet via which the nth substrate-containing solution is discharged, wherein an upper surface of the nth plate is electrically connected to the lower surface of the nth anode, the nth electrochemically active microorganisms biodegrade the nth substrate to generate electrons and hydrogen ions, the hydrogen ions passing through nth the substrate-containing solution to be transferred to the lower surface of the nth cathode, and the electrons being transferred to the cathode through the nth plate and the wire, the nth inlet and the nth outlet are disposed in two different spaces when the space inside the nth body between the lower surface of the nth cathode and the upper surface of the nth anode is equally divided into the two different spaces horizontally, and the nth cathode, the nth anode, and the nth plate are sealed in the nth body so that the nth substrate-containing solution does not leak through other portions than the nth outlet.

Here, the lower surface of the first plate is electrically connected to the upper surface of the second cathode, . . . , the lower surface of the (n−1)th plate is electrically connected to the upper surface of the nth cathode. Further, the N is an integer between 2 and 100.

According to another implementation example, (1) the first cathode is inserted into the first body or (2) a part of the first cathode protrudes from the first body in a thickness direction thereof and the other part of the first cathode is inserted into the first body, a part of the second cathode protrudes from the second body in a thickness direction thereof and the other part of the second cathode is inserted into the second body, . . . , a part of the (n−1)th cathode protrudes from the (n−1)th body in a thickness direction thereof and the other part of the (n−1)th cathode is inserted into the (n−1)th body, and a part of the nth cathode protrudes from the nth body in a thickness direction thereof and the other part of the nth cathode is inserted into the nth body.

According to yet another implementation example, the first plate is inserted into the first body, the second plate is inserted into the second body, . . . , the (n−1)th plate is inserted into the (n−1)th body, and (1) the nth plate is inserted into the nth body or (2) a part of the nth plate protrudes from the nth body in a thickness direction thereof and the other part of the nth plate is inserted into the nth body.

Here, a part of the protruding part of the second cathode is exposed to air and the other part of the protruding part is inserted into the first body such that the upper surface of the second cathode is in contact with and electrically connected to the lower surface of the first plate, . . . , a part of the protruding part of the nth cathode is exposed to air and the other part of the protruding part is inserted into the (n−1)th body such that the upper surface of the nth cathode is in contact with and electrically connected to the lower surface of the (n−1)th plate.

According to another implementation example, (2) a part of the first cathode protrudes from the first body in a thickness direction thereof and the other part of the first cathode is inserted into the first body, and (2) a part of the nth plate protrudes from the nth body in a thickness direction thereof and the other part of the nth plate is inserted into the nth body.

According to yet another implementation example, the stack of electrolyte-membraneless microbial fuel cells further includes a ring-like top collector put on the periphery of the protruding part of the first cathode.

According to another implementation example, the stack of electrolyte-membraneless microbial fuel cells further includes at least one of external wiring electrically connecting the first cathode to the first plate or external wiring electrically connecting the top collector to the first plate, or both of the two types of external wiring.

According to another implementation example, an in-parallel combination of stacks of electrolyte-membraneless microbial fuel cells is provided, including (1) a first stack of electrolyte-membraneless microbial fuel cells, (2) a second stack of electrolyte-membraneless microbial fuel cells, . . . , (M−1) an (M−1)th stack of electrolyte-membraneless microbial fuel cells, and (M) an Mth stack of electrolyte-membraneless microbial fuel cells.

Each of the first stack of electrolyte-membraneless microbial fuel cells, the second stack of electrolyte-membraneless microbial fuel cells, . . . , the (M−1)th stack of electrolyte-membraneless microbial fuel cells, and the Mth stack of electrolyte-membraneless microbial fuel cells is the stack of electrolyte-membraneless microbial fuel cells according to any one of various exemplary embodiments.

Further, the first cathode of the first stack of electrolyte-membraneless microbial fuel cells, the first cathode of the second stack of electrolyte-membraneless microbial fuel cells, . . . , the first cathode of the (M−1)th stack of electrolyte-membraneless microbial fuel cells, and the first cathode of the Mth stack of electrolyte-membraneless microbial fuel cells are electrically connected to one another.

In addition, the nth plate of the first stack of electrolyte-membraneless microbial fuel cells, the nth plate of the second stack of electrolyte-membraneless microbial fuel cells, . . . , the nth plate of the (M−1)th stack of electrolyte-membraneless microbial fuel cells, and the nth plate of the Mth stack of electrolyte-membraneless microbial fuel cells are electrically connected to one another.

Here, the M is an integer between 2 and 100 and N is an integer between 2 and 100.

According to an implementation example, the first stack of electrolyte-membraneless microbial fuel cells has the first cathode with a part thereof protruding from the first body of the first stack of electrolyte-membraneless microbial fuel cells in a thickness direction thereof and further includes a first top collector put on the periphery of the protruding part of the first cathode of the first stack of electrolyte-membraneless microbial fuel cells so as to be electrically connected to the first cathode of the first stack of electrolyte-membraneless microbial fuel cells.

Likewise, the second stack of electrolyte-membraneless microbial fuel cells has the first cathode with a part thereof protruding from the first body of the second stack of electrolyte-membraneless microbial fuel cells in a thickness direction thereof and further includes a second top collector put on the periphery of the protruding part of the first cathode of the second stack of electrolyte-membraneless microbial fuel cells so as to be electrically connected to the first cathode of the second stack of electrolyte-membraneless microbial fuel cells.

Description on the middle part is omitted.

The (M−1)th stack of electrolyte-membraneless microbial fuel cells has the first cathode with a part thereof protruding from the first body of the (M−1)th stack of electrolyte-membraneless microbial fuel cells in a thickness direction thereof and further includes an (M−1)th top collector put on the periphery of the protruding part of the first cathode of the (M−1)th stack of electrolyte-membraneless microbial fuel cells so as to be electrically connected to the first cathode of the (M−1)th stack of electrolyte-membraneless microbial fuel cells.

Finally, the Mth stack of electrolyte-membraneless microbial fuel cells has the first cathode with a part thereof protruding from the first body of the Mth stack of electrolyte-membraneless microbial fuel cells in a thickness direction thereof and further includes an Mth top collector put on the periphery of the protruding part of the first cathode of the Mth stack of electrolyte-membraneless microbial fuel cells so as to be electrically connected to the first cathode of the Mth stack of electrolyte-membraneless microbial fuel cells.

Here, the first top collector is electrically connected to the second top collect, . . . , the (M−1)th top collector is electrically connected to the Mth top collector.

In addition, a part of the nth plate of the first stack of electrolyte-membraneless microbial fuel cells protrudes from the nth body of the first stack of electrolyte-membraneless microbial fuel cells in a thickness direction thereof, a part of the nth plate of the second stack of electrolyte-membraneless microbial fuel cells protrudes from the nth body of the second stack of electrolyte-membraneless microbial fuel cells in a thickness direction thereof, . . . , a part of the nth plate of the (M−1)th stack of electrolyte-membraneless microbial fuel cells protrudes from the nth body of the (M−1)th stack of electrolyte-membraneless microbial fuel cells in a thickness direction thereof, and a part of the nth plate of the Mth stack of electrolyte-membraneless microbial fuel cells protrudes from the nth body of the Mth stack of electrolyte-membraneless microbial fuel cells in a thickness direction thereof.

The protruding part of the nth plate of the first stack of electrolyte-membraneless microbial fuel cells is electrically connected to the protruding part of the nth plate of the second stack of electrolyte-membraneless microbial fuel cells, . . . , the protruding part of the nth plate of the (M−1)th stack of electrolyte-membraneless microbial fuel cells is electrically connected to the protruding part of the nth plate of the Mth stack of electrolyte-membraneless microbial fuel cells.

According to another implementation example, the first top collector, the second top collector, . . . , the (M−1) top collector, and the Mth top collector may be manufactured as a single component connected to one another, and the nth plate of the first stack of electrolyte-membraneless microbial fuel cells, the nth plate of the second stack of electrolyte-membraneless microbial fuel cells, . . . , the nth plate of the (M−1) the stack of electrolyte-membraneless microbial fuel cells, and the nth plate of the Mth stack of electrolyte-membraneless microbial fuel cells may be manufactured as a single component connected to one another, such that the M stacks may be physically combined without a separate coupling means to configure an in-parallel combination thereof.

According to another implementation example, the substrate-containing solution discharged from the nth outlet of the Mth stack of electrolyte-membraneless microbial fuel cells is introduced into the nth body of the (M−1)th stack of the electrolyte-membraneless microbial fuel cells via the nth inlet of the (M−1)th stack of the electrolyte-membraneless microbial fuel cells, . . . , the substrate-containing solution discharged from the nth outlet of the second stack of electrolyte-membraneless microbial fuel cells is introduced into the nth body of the first stack of the electrolyte-membraneless microbial fuel cells via the nth inlet of the first stack of the electrolyte-membraneless microbial fuel cells.

Further, the substrate-containing solution discharged from the (n−1)th outlet of the Mth stack of electrolyte-membraneless microbial fuel cells is introduced into the (n−1)th body of the (M−1)th stack of the electrolyte-membraneless microbial fuel cells via the (n−1)th inlet of the (M−1)th stack of the electrolyte-membraneless microbial fuel cells, . . . , the substrate-containing solution discharged from the (n−1)th outlet of the second stack of electrolyte-membraneless microbial fuel cells is introduced into the (n−1)th body of the first stack of the electrolyte-membraneless microbial fuel cells via the (n−1)th inlet of the first stack of the electrolyte-membraneless microbial fuel cells.

Description on the middle part is omitted.

The substrate-containing solution discharged from the second outlet of the Mth stack of electrolyte-membraneless microbial fuel cells is introduced into the second body of the (M−1)th stack of the electrolyte-membraneless microbial fuel cells via the second inlet of the (M−1)th stack of the electrolyte-membraneless microbial fuel cells, . . . , the substrate-containing solution discharged from the second outlet of the second stack of electrolyte-membraneless microbial fuel cells is introduced into the second body of the first stack of the electrolyte-membraneless microbial fuel cells via the second inlet of the first stack of the electrolyte-membraneless microbial fuel cells.

Finally, the substrate-containing solution discharged from the first outlet of the Mth stack of electrolyte-membraneless microbial fuel cells is introduced into the first body of the (M−1)th stack of the electrolyte-membraneless microbial fuel cells via the first inlet of the (M−1)th stack of the electrolyte-membraneless microbial fuel cells, . . . , the substrate-containing solution discharged from the first outlet of the second stack of electrolyte-membraneless microbial fuel cells is introduced into the first body of the first stack of the electrolyte-membraneless microbial fuel cells via the first inlet of the first stack of the electrolyte-membraneless microbial fuel cells.

Now, embodiments of the present invention will be described in detail. The embodiments are merely illustrative and should not be construed as limiting the scope of the present invention. It is to be noted that the information contained in the disclosure of this specification is sufficient to enable those skilled in the art to easily practice the claimed invention even without specific experiment results.

The present invention is directed to an approach to modularize an MFC as a series circuit and scale up the MFC. FIGS. 5(a) to 5(c) shows a specific structure for the approach. An MFC system according to the present invention employs 1) a semi-bipolar plate including an air-exposed cathode for simplifying the structure for serial connection, and 2) an open compartment with no electrolyte membrane for the purpose of addressing problems relating to closed single- or double-chamber structure with an electrolyte. In the specification, various implementation examples of scaling up an MFC and modularizing it as a series circuit will be described. In addition, in the specification, specific means for modularizing an MFC as a series circuit will be described.

Referring to FIG. 5(a), an MFC unit and elements thereof are depicted along with dimensions. The MFC unit includes a cylindrical acrylic body (insertion dimensions; radius, height), an anode (diameter of 5 cm, thickness of 2.54 cm), a cathode (diameter of 5 cm, thickness of 2.54 cm), and a waterproof, rigid graphite plate (diameter of 5 cm, thickness of 0.2 cm) located at the lower part of the MFC for preventing water leakage and air introduction into the anode. A part of the anode (2.04 cm) is exposed to air and the rest of the part (0.5 cm) is soaked in medium (see FIG. 5(a).) Three MFC units may be directly connected to one another without using external wiring, such that a stacked MFC may be produced, as shown in FIG. 5(c). Briefly looking at the structure of the stacked MFC, the anode on the waterproof graphite plate of one MFC unit (e.g., MFC unit 2) is stacked on the cathode of another MFC unit (e.g., MFC unit 1), which forms a serial connection supported by the semi-bipolar plate as depicted by FIG. 5(b). The semi-bipolar plate, which is an essential feature of the present invention, makes the MFC units connected in series without disturbing the metabolism of ARB, thanks to the waterproof, rigid graphite plate located between the anode and the cathode. The bipolar plate, which is commonly used in chemical fuel cells, is a rectangular, graphite plate. One surface of the plate serves as an anode and the other surface serves as a cathode. The bipolar structure, however, significantly disturbing the metabolism of ARBs because oxygen molecules provided at the cathode side may be immediately diffused to the anode side. Another feature of the semi-bipolar plate is that a graphite felt is used as an electrode for providing high specific surface area so as to improve low kinetics at the anode and the cathode.

Each of the MFC units was inoculated with 157 mL of anaerobe digestion sludge obtained from brewery wastewater disposal plate (located in Gwang-ju, Korea), and then acetate medium was provided using a peristaltic pump at 0.072±0.8 mL/min (hydraulic retention time (HRT) of 36.35±3.27 hrs). In order to adapt ARBs of an anode, the MFC units have been operated in a closed circuit mode (CCM) using an external load of 1 kΩ until voltages of the MFC units are stabilized (approximately for four days). After the voltages output from the MFC units were stabilized, the operation mode of the MFC units was changed from the CCM to an open circuit mode (OCM). A Discharge test was performed for every MFC unit. In this experiment, the external load was changed from 100 kΩ to 1 kΩ (100, 40, 30, 20, 15, 10, 5, and 1 kΩ). In each of the MFC units, discharge was performed for 15 minutes, and voltage was monitored using a multimeter (Keithly 2700). Then, a discharge test was performed on the stacked MFC in the same manner.

In order to evaluate the performances of the semi-bipolar plate of the stacked MFC, a performance evaluation test was performed on three MFC units connected in series. Here, I-V curves of the MFC units, the stacked MFC with semi bipolar plate, the stacked MFC with electrical wire were compared.

In order to figure out the important factor causing overpotential to the MFC units connected in series, the inner resistances of each of the MFC units and the stacked MFC were analyzed. The inner resistances were measured using a Nyquist plot obtained from an electrochemical impedance spectroscopy (EIS) spectrum measured using Autolab (Eco Chemie, Utrecht, The Netherlands) with a FRA-ADC impedance module.

The EIS spectrum was obtained in the frequency range of 100 kHz to 0.01 Hz, under the conditions of variable voltage, cathode open circuit voltage (OCP), amplitude of 10 mV, and two-electrode structure. FIG. 1 shows performance curves obtained from the stacked MFC and each of the MFC units shown in FIG. 5. The OCVs of the MFC units were 0.53 V, 0.51 V, and 0.53 V, respectively. The OCV of the stacked MFC was 1.58 V, which was multiplied by three times. This value is close to the sum of the voltages obtained from the MFC units. As the external load was reduced from 100 kΩ to 1 kΩ, the voltage of the stacked MFC was gradually reduced even though it is equal to the sum of the voltages obtained from the MFC units (see FIG. 1).

Figure 2:
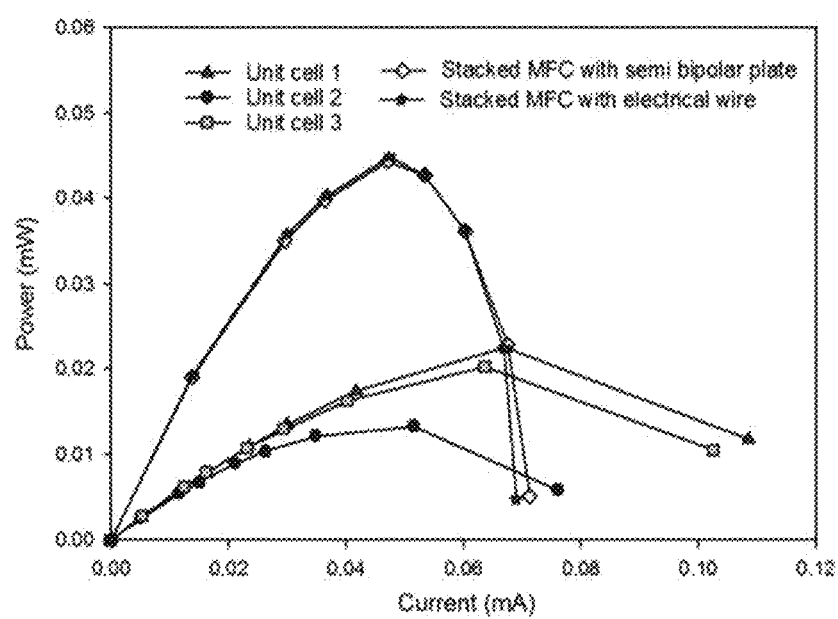
FIG. 2 is a diagram showing graphs representing power curves of MFC units, a stacked MFC with semi bipolar plate, and a stacked MFC with electrical wire.

The maximum power from the stacked MFC is 2.5 times the average maximum power from the MFC units while the maximum current from the stacked MFC is about 75% of the average maximum current from the MFC units (see FIG. 2). This means that inner resistance of the stacked MFC in which the MFC units are stacked in series has been increased.

The inner resistance of the MFC includes three factors, i.e., charge-transfer resistance (activation loss, Rct), solution resistance (ohm loss, Rs), and mass transfer resistance (mass loss, Rm). In order to check which one of the resistances is the largest in the stacked MFC, I-V curves of the MFC units and the stacked MFC were obtained manually.

Figure 3:
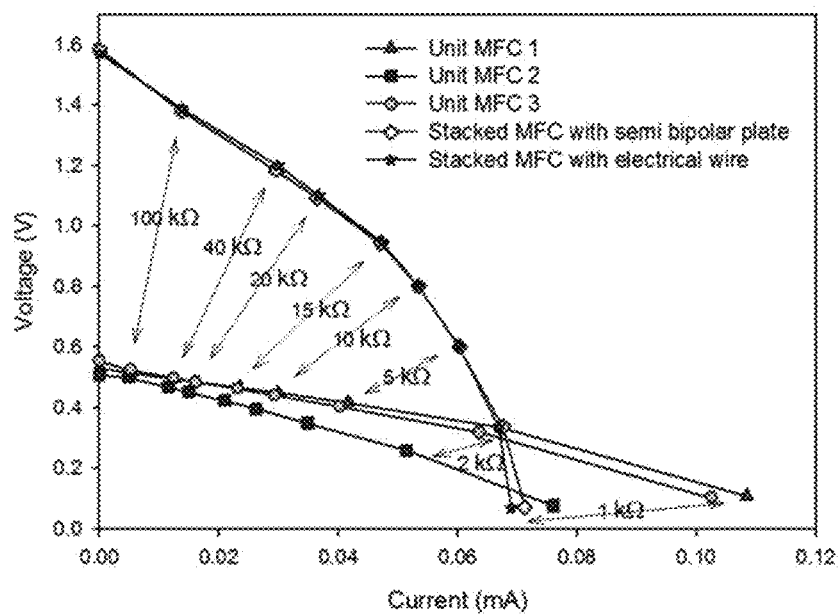
FIG. 3 is a diagram showing graphs representing I-V curves of MFC units, a stacked MFC with semi bipolar plate, and a stacked MFC with electrical wire.

The voltage of the stacked MFC was linearly decreased under the external load of 100 kΩ to 15 kΩ (overvoltage: 0.6 V), and thus it is considered that Rct and Rs are dominant under the external load of 100 kΩ to 15 kΩ (see FIG. 3). The linearity of the voltage reduction is more abrupt in the stacked MFC than in the MFC units under the external load. However, it can be explained taking into account that the total inner resistance of the stacked MFC is theoretically equal to the sum of the inner resistances of the MFC units.

Figure 4:
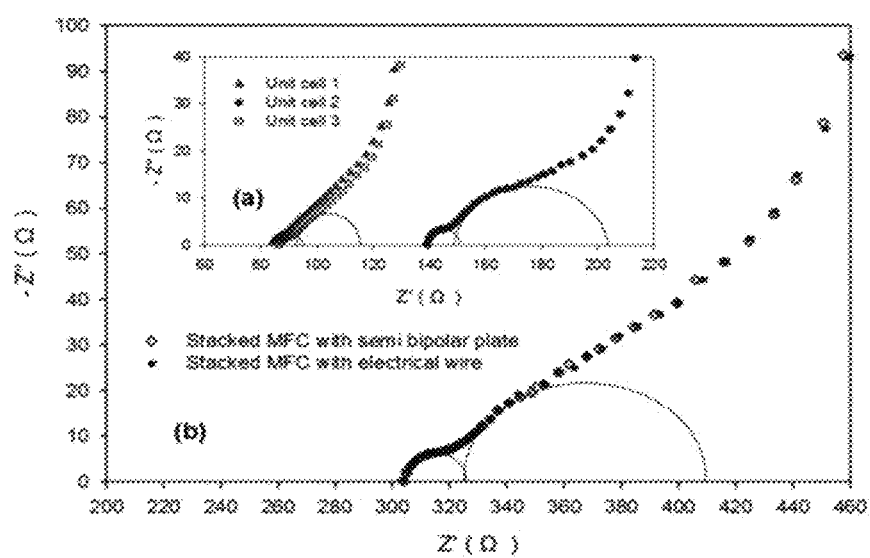
FIG. 4 is a diagram showing graphs representing Nyquist plots of MFC units, a stacked MFC with semi bipolar plate, and a stacked MFC with electrical wire.

In order to check which one of the Rct and Rs occurring between 100 kΩ and 15 kΩ is more dominant, a Nyquist plot was obtained using EIS. As expected, the anode charge-transfer resistance Rct, the cathode charge-transfer resistance Rct, and the solution resistance Rs of the stacked MFC are very close to the sums of the anode charge-transfer resistances Rct, the cathode charge-transfer resistances Rct, and the solution resistances Rs of the MFC units, respectively (see FIG. 4 and Table 1).

TABLE 1

| Internal Resistance (Ω) | Unit MFC 1 | Unit MFC 2 | Unit MFC 3 | Unit 1 + 2 + 3 | Stacked MFC |
|---|---|---|---|---|---|
| Anode $R_{ct}$ | 5.21 ± 0.11 | 10.96 ± 0.68 | 6.39 ± 0.05 | 22.47 ± 0.84 | 20.46 ± 0.26 |
| Cathode $R_{ct}$ | 109.33 ± 3.66 | 114.48 ± 5.27 | 102.86 ± 9.40 | 326.67 ± 18.33 | 310.00 ± 11.78 |
| $R_s$ | 83.64 ± 0.00 | 139.09 ± 0.01 | 86.01 ± 0.01 | 308.74 ± 0.02 | 303.46 ± 0.01 |
| Sum | 198.18 ± 3.76 | 264.55 ± 5.94 | 195.27 ± 9.45 | 658.00 ± 19.15 | 633.93 ± 12.05 |

Among these, the anode charge-transfer resistance Rct of the stacked MFC is relatively low compared to the solution resistance Rs and the cathode charge-transfer resistance Rct. Based on the result, it can be seen that the solution resistance Rs and the cathode charge-transfer resistance Rct are the most important resistances in the stacked MFC, occupying 98% of the total inner resistance. The solution resistance Rs includes electronic resistance RE and ionic resistance RI. Therefore, when the solution resistance Rs exhibits a high value, it may be caused by one of the following two possibilities: 1) first, the electronic resistance RE occurring at the semi-bipolar plate, and 2) second, the ionic resistance RI occurring in the solution between the anode and cathode of each of the MFC units. If the rigid graphite is in contact with the electrode defectively so that conductivity of the semi-bipolar plate is bad, it may be determined that the electronic resistance RE may be increased. In order to check which one of the electronic resistance RE and the ionic resistance RI influences the solution resistance Rs of the stacked MFC, the electronic resistance RE at the semi-bipolar plate was analyzed from the Nyquist plot of the EIS. The electronic resistance RE at the semi-bipolar plate between the first and second cells is 1.3Ω, and the electronic resistance RE between the second and third cells is 1.6Ω. In addition to the EIS measurement, the anode of one of the MFC units is connected to the cathode of the next one of the MFC units, and I-V curves of the MFC units stacked with the semi-bipolar plate and the MFC stacked with electric wiring are compared. As a result, it was seen that more current flowed in the MFC stacked with the semi-bipolar plate (even if the difference may not be significant). Further, the solution resistance Rs of the stacked MFC is very close to the sum of the solution resistance Rs of each of the MFC units. This shows that the ionic resistance RI influences the solution resistance Rs of the stacked MFC. This means that using the semi-bipolar plate reduces the electronic resistance RE occurring at the interface between the electrode and the electric wiring. Based on the result, it may be concluded that the semi-bipolar plate is applicable to and suitable for stacked MFC which includes the air-exposed cathode but has no electrolyte membrane.

The overvoltage due to the ionic resistance RI is merely a part of the total overvoltage generated between 100 kΩ and 1 kΩ in the stacked MFC. Another overvoltage (0.9 V) was generated between 10 kΩ and 1 kΩ (see FIG. 3). It may be simply concluded that this is due to mass transfer resistance Rm. However, this conclusion may be wrong because the mass transfer limitation is not significant at 1 kΩ in the MFC units. On the contrary, the stacked MFC does not exhibit the same behavior at 10 kΩ even if the load is ten times larger at 10 kΩ and in the 1 kΩ. This may lead an extraordinary result that more current flows under the lower external load.

However, this result may be explained based on the electrochemical basic principles of dry cells or batteries connected in series. Current flow is exactly proportional to voltage applied. For example, if voltage (pressure) increases twofold, so does current flow. The start voltage of the stacked MFC is 1.58 V which is three-fold that of the MFC units, and thus the total current is supposed to be three-fold the MFC units under the external load.

As can be seen from FIG. 3, between 100 kΩ and 40 kΩ, the collect rate of the total current in the stacked MFC is equal to or more than 85% of the sum of current of each of the MFC units. The rest, i.e., 15% may be considered to be lost due to increases in the solution resistance Rs and the charge-transfer resistance Rct in the stacked MFC. However, because the amount of current is gradually increased as the external load is reduced from 40 kΩ to 1 kΩ, the current collect rate in the stacked MFC is significantly reduced from 80% to 20%.

It is apparent from the result that the two-fold or more current (corresponding to the collect rate of 85%) between 100 kΩ and 40 kΩ caused depletion of electrons in the range of 40 kΩ to 1 kΩ, and that substantial overvoltage appeared in the stacked MFC.

Figure 5:
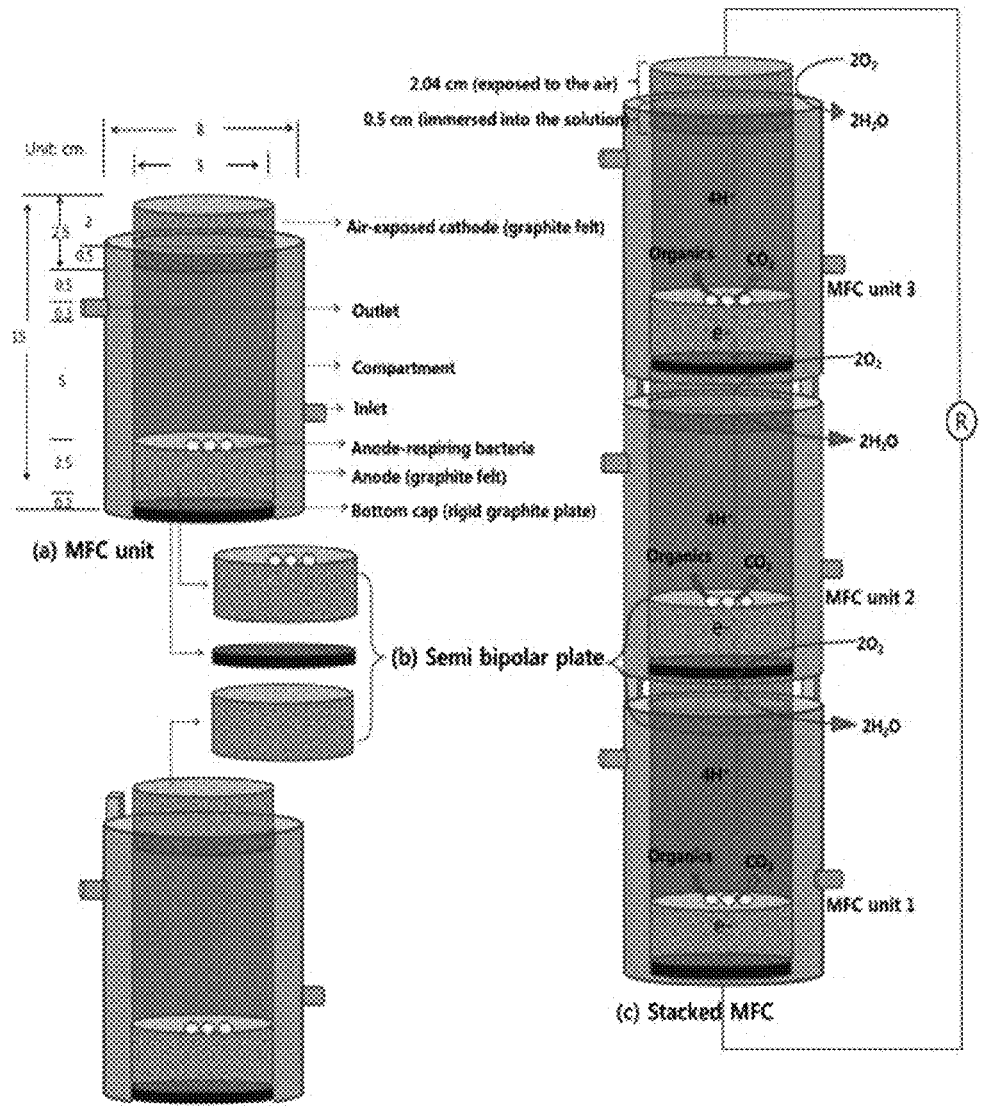
FIG. 5 is a view showing an MFC unit, elements and dimensions of the unit, a configuration of a semi-bipolar plate in an MFC system, and a module system in which three MFC units are stacked in series by semi-bipolar plates according to an exemplary embodiment of the present invention.
Figure 6:
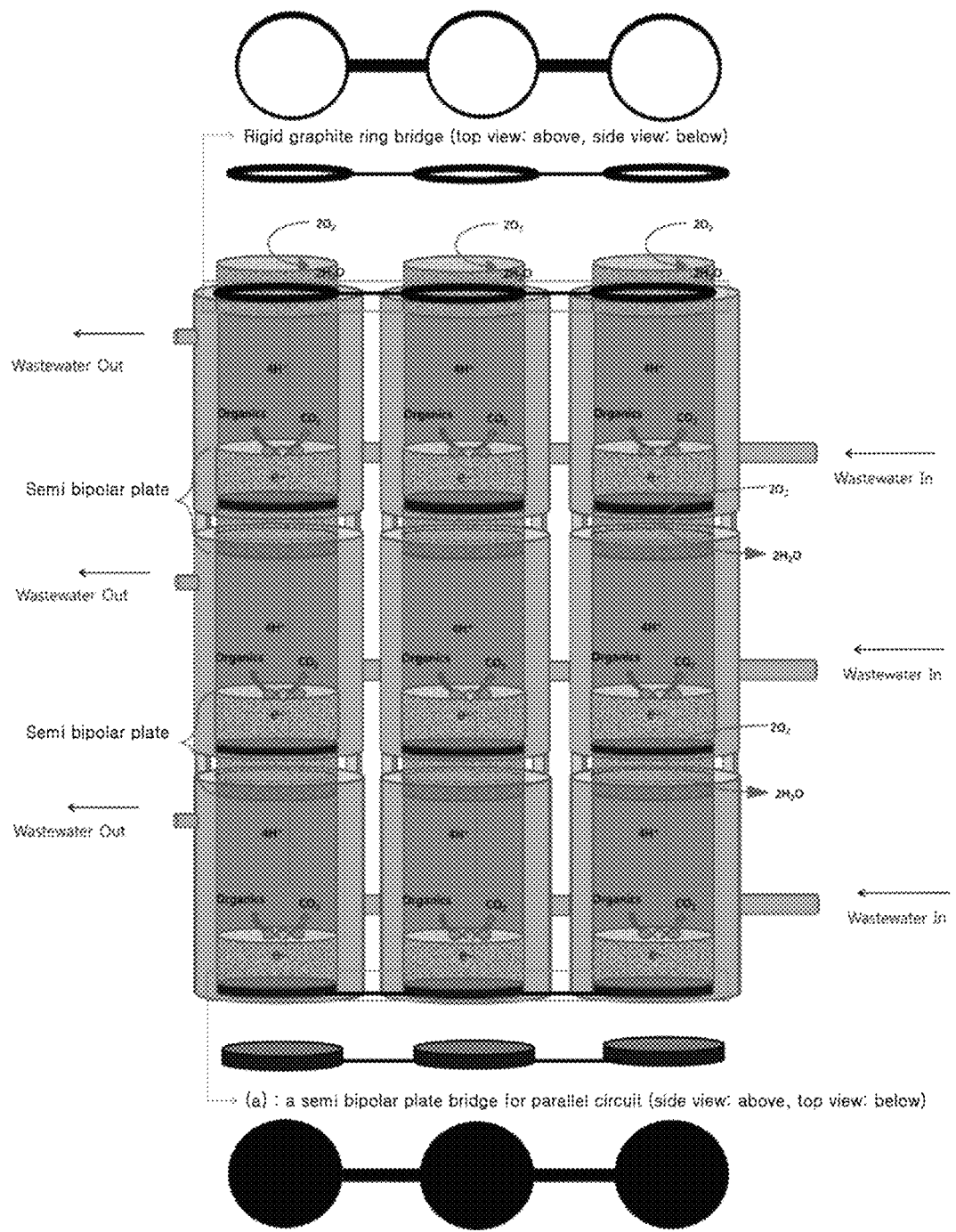
FIG. 6 is a view schematically showing an MFC module system according to an exemplary embodiment of the present invention.

The terminal semi-bipolar plate shown in FIG. 5(*b*) acts as a bridge to connect stacks of the MFC units including the same. The cathode of the top MFC unit of the stack of the MFC units may be connected to the rigid graphite or metal ring bridge (see FIG. 5(*b*)). By employing the bridge, the performance of the anode and the cathode may be improved. The above-described MFC units neither employed a cathode catalyst such as Pt/C which is activated with an oxygen reduction reaction (ORR) nor perform any pre-processing on the anode and cathode.

Therefore, in addition to various implementation examples of the MFC modules, the performance of the MFC may be maximized using methods for improving the performance of the anode and cathode known in the art.

As set forth above, according to the present invention, problems relating to scaling up and modularization can be overcome, and problems relating to using an electrolyte membrane can be solved.

What is claimed is:
1. An electrolyte-membraneless microbial fuel cell, a unit of the microbial fuel cell comprising:
(a) a body having empty top, bottom and inside;
(b) a cathode disposed on the top of the body;
(c) an anode disposed on the bottom of the body;
(d) a plate disposed on a lower surface of the anode;
(e) electrochemically active microorganisms disposed on an upper surface of the anode;
(f) a substrate-containing solution disposed filling the space inside the body between a lower surface of the cathode and the upper surface of the anode;
(g) an inlet via which the substrate-containing solution is introduced; and
(h) an outlet via which the substrate-containing solution is discharged, wherein:
an upper surface of the plate is electrically connected to the lower surface of the anode;
the electrochemically active microorganisms biodegrade the substrate to generate electrons and hydrogen ions, the hydrogen ions passing through the substrate-containing solution to be transferred to the lower surface of the cathode, and the electrons being transferred to the cathode through the plate;
the inlet and the outlet are disposed in two different spaces when the space inside the body between the lower surface of the cathode and the upper surface of the anode is equally divided into the two different spaces horizontally; and
the cathode, the anode, and the plate are sealed in the body so that the substrate-containing solution does not leak through other portions than the outlet.

2. A stack of electrolyte-membraneless microbial fuel cells, comprising (A) a first electrolyte-membraneless microbial fuel cell, (B) a second electrolyte-membraneless microbial fuel cell, . . . , (n−1)th a (n−1)th electrolyte-membraneless microbial fuel cell, and (N) a nth electrolyte-membraneless microbial fuel cell, wherein the second electrolyte-membraneless microbial fuel cell is disposed under the first electrolyte-membraneless microbial fuel cell, . . . , the nth electrolyte-membraneless microbial fuel cell is disposed under the (n−1)th electrolyte-membraneless microbial fuel cell, wherein:
the (A) first electrolyte-membraneless microbial fuel cell includes:
(Aa) a first body having empty top, bottom and inside;
(Ab) a first cathode disposed on the top of the first body;
(Ac) a first anode disposed on the bottom of the first body;
(Ad) a first plate disposed on a lower surface of the first anode;
(Ae) first electrochemically active microorganisms disposed on an upper surface of the first anode;
(Af) a first substrate-containing solution filling a first space inside the first body between a lower surface of the first cathode and the upper surface of the first anode;
(Ag) a first inlet via which the first substrate-containing solution is introduced; and
(Ah) a first outlet via which the first substrate-containing solution is discharged, wherein:
an upper surface of the first plate is electrically connected to the lower surface of the first anode;
the first electrochemically active microorganisms biodegrade the first substrate to generate electrons and hydrogen ions, the hydrogen ions passing through first the substrate-containing solution to be transferred to the lower surface of the first cathode, and the electrons being transferred to the cathode through the first plate;
the first inlet and the first outlet are disposed in two different spaces when the first space inside the first body between the lower surface of the first cathode and the upper surface of the first anode is equally divided into the two different spaces horizontally; and the first cathode, the first anode, and the first plate are sealed in the first body so that the first substrate-containing solution does not leak through other portions than the first outlet;

the (B) second electrolyte-membraneless microbial fuel cell includes:
  (Ba) a second body having empty top, bottom and inside;
  (Bb) a second cathode disposed on the top of the second body;
  (Bc) a second anode disposed on the bottom of the second body;
  (Bd) a second plate disposed on a lower surface of the second anode;
  (Be) second electrochemically active microorganisms disposed on an upper surface of the second anode;
  (Bf) a second substrate-containing solution filling a space inside the second body between a lower surface of the second cathode and the upper surface of the second anode;
  (Bg) a second inlet via which the second substrate-containing solution is introduced; and
  (Bh) a second outlet via which the second substrate-containing solution is discharged, wherein:
  an upper surface of the second plate is electrically connected to the lower surface of the second anode;
  the second electrochemically active microorganisms biodegrade the second substrate to generate electrons and hydrogen ions, the hydrogen ions passing through second the substrate-containing solution to be transferred to the lower surface of the second cathode, and the electrons being transferred to the cathode through the second plate;
  the second inlet and the second outlet are disposed in two different spaces when the second space inside the second body between the lower surface of the second cathode and the upper surface of the second anode is equally divided into the two different spaces horizontally; and
  the second cathode, the second anode, and the second plate are sealed in the second body so that the second substrate-containing solution does not leak through other portions than the second outlet; . . . ;

the (N−1)th electrolyte-membraneless microbial fuel cell includes:
  ((n−1)a) a (n−1)th body having empty top, bottom and inside;
  ((n−1)b) a (n−1)th cathode disposed on the top of the (n−1)th body;
  ((n−1)c) a (n−1)th anode disposed on the bottom of the (n−1)th body;
  ((n−1)d) a (n−1)th plate disposed on a lower surface of the (n−1)th anode;
  ((n−1)e) (n−1)th electrochemically active microorganisms disposed on an upper surface of the (n−1)th anode;
  ((n−1)f) a (n−1)th substrate-containing solution filling a (n−1)th space inside the (n−1)th body between a lower surface of the (n−1)th cathode and the upper surface of the (n−1)th anode;
  ((n−1)g) an (n−1)th inlet via which the (n−1)th substrate-containing solution is introduced; and
  ((n−1)h) an (n−1)th outlet via which the (n−1)th substrate-containing solution is discharged, wherein:
  an upper surface of the (n−1)th plate is electrically connected to the lower surface of the (n−1)th anode;
  the (n−1)th electrochemically active microorganisms biodegrade the (n−1)th substrate to generate electrons and hydrogen ions, the hydrogen ions passing through (n−1)th the substrate-containing solution to be transferred to the lower surface of the (n−1)th cathode, and the electrons being transferred to the cathode through the (n−1)th plate;
  the (n−1)th inlet and the (n−1)th outlet are disposed in two different spaces when the (n−1)th space inside the (n−1)th body between the lower surface of the (n−1)th cathode and the upper surface of the (n−1)th anode is equally divided into the two different spaces horizontally; and
  the (n−1)th cathode, the (n−1)th anode, and the ((n−1)th plate are sealed in the (n−1)th body so that the (n−1)th substrate-containing solution does not leak through other portions than the (n−1)th outlet;

the (N) nth electrolyte-membraneless microbial fuel cell includes:
  (n1) a nth body having empty top, bottom and inside;
  (n2) a nth cathode disposed on the top of the nth body;
  (n3) a nth anode disposed on the bottom of the nth body;
  (n4) a nth plate disposed on a lower surface of the nth anode;
  (n5) nth electrochemically active microorganisms disposed on an upper surface of the nth anode;
  (n6) a nth substrate-containing solution filling a nth space inside the nth body between a lower surface of the nth cathode and the upper surface of the nth anode;
  (n7) an nth inlet via which the nth substrate-containing solution is introduced; and
  (n8) an nth outlet via which the nth substrate-containing solution is discharged, wherein:
  an upper surface of the nth plate is electrically connected to the lower surface of the nth anode;
  the nth electrochemically active microorganisms biodegrade the nth substrate to generate electrons and hydrogen ions, the hydrogen ions passing through nth the substrate-containing solution to be transferred to the lower surface of the nth cathode, and the electrons being transferred to the cathode through the nth plate and the wire;
  the nth inlet and the nth outlet are disposed in two different spaces when the nth space inside the nth body between the lower surface of the nth cathode and the upper surface of the nth anode is equally divided into the two different spaces horizontally; and
  the nth cathode, the nth anode, and the nth plate are sealed in the nth body so that the nth substrate-containing solution does not leak through other portions than the nth outlet; and the lower surface of the first plate is electrically connected to the upper surface of the second cathode, . . . , the lower surface of the (n−1)th plate is electrically connected to the upper surface of the nth cathode, wherein the N is an integer between 2 and 100.

3. The stack of electrolyte-membraneless microbial fuel cells of claim 2, wherein:
  (1) the first cathode is inserted into the first body or (2) a part of the first cathode protrudes from the first body in a thickness direction thereof and the other part of the first cathode is inserted into the first body, a part of the second cathode protrudes from the second body in a thickness direction thereof and the other part of the second cathode is inserted into the second body, . . . , a part of the (n−1)th cathode protrudes from the (n−1)th body in a thickness direction thereof and the other part of the (n−1)th cathode is inserted into the (n−1)th body, and a part of the nth cathode protrudes from the nth body in a thickness direction thereof and the other part of the nth cathode is inserted into the nth body;

the first plate is inserted into the first body, the second plate is inserted into the second body, . . . , the (n−1)th plate is inserted into the (n−1)th body, and (1) the nth plate is inserted into the nth body or (2) a part of the nth plate protrudes from the nth body in a thickness direction thereof and the other part of the nth plate is inserted into the nth body; and a part of the protruding part of the second cathode is exposed to air and the other part of the protruding part is inserted into the first body such that the upper surface of the second cathode is in contact with and electrically connected to the lower surface of the first plate, . . . , a part of the protruding part of the nth cathode is exposed to air and the other part of the protruding part is inserted into the (n−1)th body such that the upper surface of the nth cathode is in contact with and electrically connected to the lower surface of the (n−1)th plate.

4. The stack of electrolyte-membraneless microbial fuel cells of claim 3, wherein:

(2) a part of the first cathode protrudes from the first body in a thickness direction thereof and the other part of the first cathode is inserted into the first body; and (2) a part of the nth plate protrudes from the nth body in a thickness direction thereof and the other part of the nth plate is inserted into the nth body.

5. The stack of electrolyte-membraneless microbial fuel cells of claim 4, further comprising a ring-like top collector put on the periphery of the protruding part of the first cathode.

6. The stack of electrolyte-membraneless microbial fuel cells of claim 5, further comprising at least one of external wiring electrically connecting the first cathode to the first plate or external wiring electrically connecting the top collector to the first plate, or both of the two types of external wiring.

7. An in-parallel combination of stacks of electrolyte-membraneless microbial fuel cells, comprising (1) a first stack of electrolyte-membraneless microbial fuel cells, (2) a second stack of electrolyte-membraneless microbial fuel cells, . . . , (M−1) an (M−1)th stack of electrolyte-membraneless microbial fuel cells, and (M) an Mth stack of electrolyte-membraneless microbial fuel cells, wherein:

each of the first stack of electrolyte-membraneless microbial fuel cells, the second stack of electrolyte-membraneless microbial fuel cells, . . . , the (M−1)th stack of electrolyte-membraneless microbial fuel cells, and the Mth stack of electrolyte-membraneless microbial fuel cells is the stack of electrolyte-membraneless microbial fuel cells according to claim 2;

the first cathode of the first stack of electrolyte-membraneless microbial fuel cells, the first cathode of the second stack of electrolyte-membraneless microbial fuel cells, . . . , the first cathode of the (M−1)th stack of electrolyte-membraneless microbial fuel cells, and the first cathode of the Mth stack of electrolyte-membraneless microbial fuel cells are electrically connected to one another;

the nth plate of the first stack of electrolyte-membraneless microbial fuel cells, the nth plate of the second stack of electrolyte-membraneless microbial fuel cells, . . . , the nth plate of the (M−1)th stack of electrolyte-membraneless microbial fuel cells, and the nth plate of the Mth stack of electrolyte-membraneless microbial fuel cells are electrically connected to one another; and the M is an integer between 2 and 100 and N is an integer between 2 and 100.

8. The in-parallel combination of stacks of electrolyte-membraneless microbial fuel cells of claim 7, wherein:

the first stack of electrolyte-membraneless microbial fuel cells has the first cathode with a part thereof protruding from the first body of the first stack of electrolyte-membraneless microbial fuel cells in a thickness direction thereof and further includes a first top collector put on the periphery of the protruding part of the first cathode of the first stack of electrolyte-membraneless microbial fuel cells so as to be electrically connected to the first cathode of the first stack of electrolyte-membraneless microbial fuel cells, the second stack of electrolyte-membraneless microbial fuel cells has the first cathode with a part thereof protruding from the first body of the second stack of electrolyte-membraneless microbial fuel cells in a thickness direction thereof and further includes a second top collector put on the periphery of the protruding part of the first cathode of the second stack of electrolyte-membraneless microbial fuel cells so as to be electrically connected to the first cathode of the second stack of electrolyte-membraneless microbial fuel cells, . . . , the (M−1)th stack of electrolyte-membraneless microbial fuel cells has the first cathode with a part thereof protruding from the first body of the (M−1)th stack of electrolyte-membraneless microbial fuel cells in a thickness direction thereof and further includes an (M−1)th top collector put on the periphery of the protruding part of the first cathode of the (M−1)th stack of electrolyte-membraneless microbial fuel cells so as to be electrically connected to the first cathode of the (M−1)th stack of electrolyte-membraneless microbial fuel cells, and the Mth stack of electrolyte-membraneless microbial fuel cells has the first cathode with a part thereof protruding from the first body of the Mth stack of electrolyte-membraneless microbial fuel cells in a thickness direction thereof and further includes an Mth top collector put on the periphery of the protruding part of the first cathode of the Mth stack of electrolyte-membraneless microbial fuel cells so as to be electrically connected to the first cathode of the Mth stack of electrolyte-membraneless microbial fuel cells;

the first top collector is electrically connected to the second top collect, . . . , the (M−1)th top collector is electrically connected to the Mth top collector;

a part of the nth plate of the first stack of electrolyte-membraneless microbial fuel cells protrudes from the nth body of the first stack of electrolyte-membraneless microbial fuel cells in a thickness direction thereof, a part of the nth plate of the second stack of electrolyte-membraneless microbial fuel cells protrudes from the nth body of the second stack of electrolyte-membraneless microbial fuel cells in a thickness direction thereof, . . . , a part of the nth plate of the (M−1)th stack of electrolyte-membraneless microbial fuel cells protrudes from the nth body of the (M−1)th stack of electrolyte-membraneless microbial fuel cells in a thickness direction thereof, and a part of the nth plate of the Mth stack of electrolyte-membraneless microbial fuel cells protrudes from the nth body of the Mth stack of electrolyte-membraneless microbial fuel cells in a thickness direction thereof; and the protruding part of the nth plate of the first stack of electrolyte-membraneless microbial fuel cells is electrically connected to the protruding part of the nth plate of the second stack of electrolyte-membraneless microbial fuel cells, . . . , the protruding part of the nth plate of the (M−1)th stack of electrolyte-membraneless microbial fuel cells is electrically connected to the protruding part of the nth plate of the Mth stack of electrolyte-membraneless microbial fuel cells.

9. The in-parallel combination of stacks of electrolyte-membraneless microbial fuel cells of claim 8, wherein:
the first top collector, the second top collector, . . . , the (M−1) top collector, and the Mth top collector are a single component connected to one another; and
the nth plate of the first stack of electrolyte-membraneless microbial fuel cells, the nth plate of the second stack of electrolyte-membraneless microbial fuel cells, . . . , the nth plate of the (M−1) the stack of electrolyte-membraneless microbial fuel cells, and the nth plate of the Mth stack of electrolyte-membraneless microbial fuel cells are a single component connected to one another.

10. The in-parallel combination of stacks of electrolyte-membraneless microbial fuel cells of claim 7, wherein:
the substrate-containing solution discharged from the nth outlet of the Mth stack of electrolyte-membraneless microbial fuel cells is introduced into the nth body of the (M−1)th stack of the electrolyte-membraneless microbial fuel cells via the nth inlet of the (M−1)th stack of the electrolyte-membraneless microbial fuel cells, . . . , the substrate-containing solution discharged from the nth outlet of the second stack of electrolyte-membraneless microbial fuel cells is introduced into the nth body of the first stack of the electrolyte-membraneless microbial fuel cells via the nth inlet of the first stack of the electrolyte-membraneless microbial fuel cells;
the substrate-containing solution discharged from the (n−1)th outlet of the Mth stack of electrolyte-membraneless microbial fuel cells is introduced into the (n−1)th body of the (M−1)th stack of the electrolyte-membraneless microbial fuel cells via the (n−1)th inlet of the (M−1)th stack of the electrolyte-membraneless microbial fuel cells, . . . , the substrate-containing solution discharged from the (n−1)th outlet of the second stack of electrolyte-membraneless microbial fuel cells is introduced into the (n−1)th body of the first stack of the electrolyte-membraneless microbial fuel cells via the (n−1)th inlet of the first stack of the electrolyte-membraneless microbial fuel cells; . . . ;
the substrate-containing solution discharged from the second outlet of the Mth stack of electrolyte-membraneless microbial fuel cells is introduced into the second body of the (M−1)th stack of the electrolyte-membraneless microbial fuel cells via the second inlet of the (M−1)th stack of the electrolyte-membraneless microbial fuel cells, . . . , the substrate-containing solution discharged from the second outlet of the second stack of electrolyte-membraneless microbial fuel cells is introduced into the second body of the first stack of the electrolyte-membraneless microbial fuel cells via the second inlet of the first stack of the electrolyte-membraneless microbial fuel cells; and
the substrate-containing solution discharged from the first outlet of the Mth stack of electrolyte-membraneless microbial fuel cells is introduced into the first body of the (M−1)th stack of the electrolyte-membraneless microbial fuel cells via the first inlet of the (M−1)th stack of the electrolyte-membraneless microbial fuel cells, . . . , the substrate-containing solution discharged from the first outlet of the second stack of electrolyte-membraneless microbial fuel cells is introduced into the first body of the first stack of the electrolyte-membraneless microbial fuel cells via the first inlet of the first stack of the electrolyte-membraneless microbial fuel cells.

* * * * *